April 7, 1931. J. ROBINSON Re. 18,034

AUTOMATIC TRAIN PIPE CONNECTER HEAD

Original Filed April 2, 1921 2 Sheets-Sheet 1

INVENTOR
Joseph Robinson
BY
Watson, Cole, Marse & Grindle
ATTORNEYS

J. ROBINSON

April 7, 1931. AUTOMATIC TRAIN PIPE CONNECTER HEAD Re. 18,034

Original Filed April 2, 1921 2 Sheets-Sheet 2

INVENTOR
Joseph Robinson
By
Watson, Cort, Morse & Grindle
ATTORNEYS

Reissued Apr. 7, 1931

Re. 18,034

UNITED STATES PATENT OFFICE

JOSEPH ROBINSON, OF NEW YORK, N. Y.

AUTOMATIC TRAIN-PIPE-CONNECTER HEAD

Original No. 1,684,376, dated September 11, 1928, Serial No. 458,119, filed April 2, 1921. Renewed October 22, 1926. Application for reissue filed December 23, 1930. Serial No. 505,154.

My invention relates to improvements in automatic train pipe connecter heads and has among its objects to provide a head of this kind in which the forces set up by the fluid pressure carried are so applied to the heads as to cause the minimum tendency to force the heads apart. In the present forms of connecter heads, of which the type shown in my United States Patent No. 1,245,779 for improvement in automatic train pipe couplings is typical, the fluid pressure passing through the ports of the head, and particularly the lowermost port, sets up forces which tend strongly to part the heads. This is due to the fact that the fluid passes through the head parallel to the axis of the buffer spring by which the heads are held together. In my improvement the fluid is passed through the head obliquely (as for instance, at an angle of approximately 45 degrees) to the axis of the spring by which the heads are held in contact. In this manner the pressure of the fluid is greatly reduced as respects its tendency to part the heads. By my present improvement the fluid pressure tends to move the heads laterally, one with respect to the other, thereby forcing the guiding means of the head into more effectual engagement, whereas with other types of coupling heads, the tendency of the fluid pressure is to blow the heads apart, this because the direction of force set up by the fluid pressure is parallel with the direction of force produced by the buffer spring used to maintain the heads in engagement, as aforesaid. Various means of automatic locks have been resorted to overcome this tendency to separate previous designs of heads, but my improvement is void of the complication incident to these locks and provides a simple and effective means for reliably minimizing the tendency of the fluid pressure to separate mated heads.

My invention exists in the combination, improvements, and construction hereinafter described, pointed out in the appended claims, and illustrated in the accompanying drawings, in which:

Figure 4:
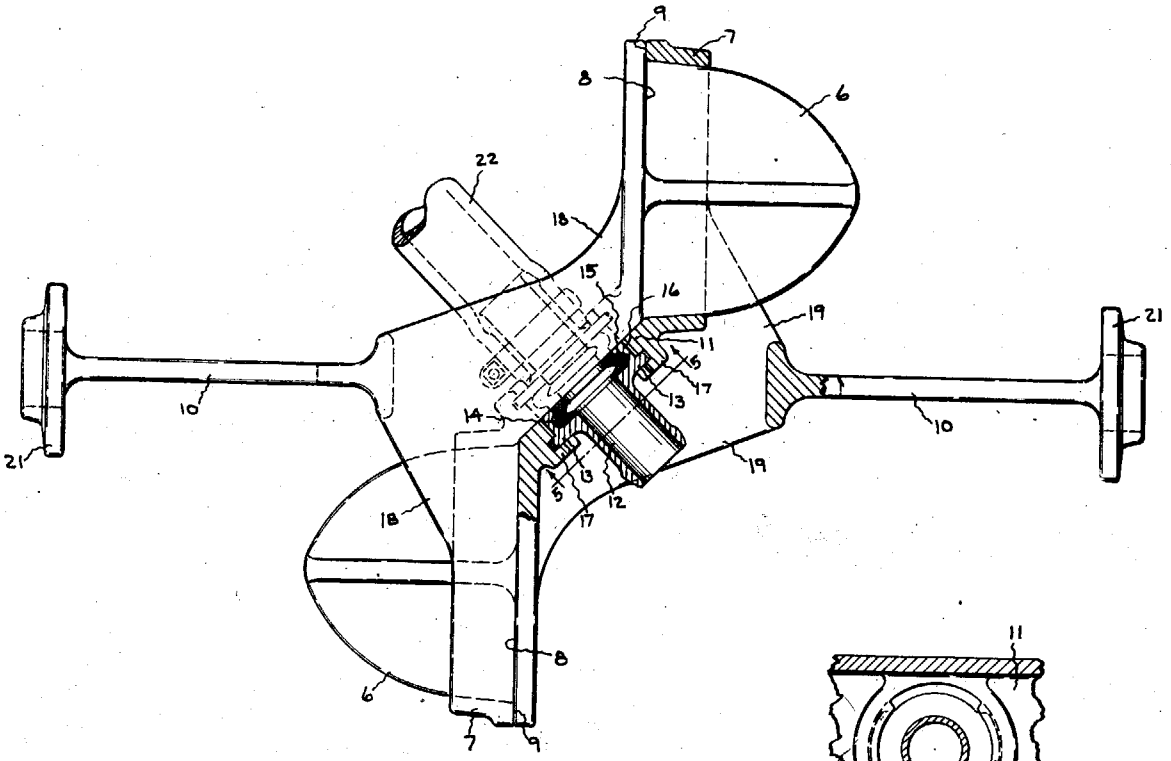
Figure 4 is a plan view of a pair of my improved coupling heads connected, one thereof being shown partly in sections. In this view the hose 22 and the fitting 12 are shown.
Figure 5:
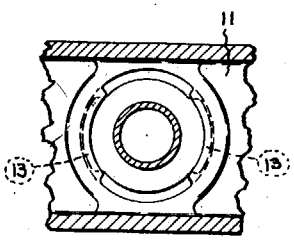
Figure 5 is a rear view of the fitting 12 and a portion of the head, taken on line 5—5 of Figure 4.

Referring to the drawings: my improved head is preferably the pin and funnel type formed separately of and adapted to be suspended beneath the car coupler of the car, although, of course, any other suitable means than the pin and funnel may be employed for aligning the head if desired. My improvement comprises the forwardly extending tapered prong or pin 6 preferably of such construction or formation as to give lightness and strength, and the funnel or guiding ring 7 entirely through which ring an opening extends, as shown. The prong is preferably positioned in advance of the funnel 7 and on the opposite side of the longitudinal axis of the head, see particularly Figure 4. The base 8 of the prong and the base or face 9 of the funnel lie preferably in vertical planes substantially at a right angle to the longitudinal axis of the supporting stem or projection 10 of the head with which projection the horn and the funnel are preferably integral. A substantially flat vertically extending portion 11 connects the funnel with the prong 6 and extends diagonally across the aforesaid axis and is preferably formed integral with the projection 10 and with the funnel and the prong. The portion 11 is provided with an opening 16 located on approximately the longitudinal center line of said projection 10 which center line the opening intersects, the opening being located on approximately the vertical center of the head. A suitable fitting or conduit 12, Figures 4 and 5, provided on diametrically opposite sides with lugs 13, and having formed in its forward end a gasket seat 14 carrying a gasket 15, is mounted in the opening 16 with the gasket 15 projecting slightly through the portion 11, the contacting face of the gasket being arranged obliquely to the longitudinal axis of the projection 10 and head. The fitting 12 is maintained in position by suitable dogs 17, formed on the rear side of the portion 11 and comprising, in connection with the lugs 13, a bayonet joint for removably maintaining the fitting or conduit in position in said perforation or opening 16. By this arrangement the conduit is normally held against any substantial or undue forward or rearward movement in the opening 16 but, when desired, the conduit and the gasket 15 may be removed rearwardly out of said opening from behind the base of the horn 6 while the head is coupled to a mating head, thus facilitating inspection and renewal of the gaskets without uncoupling the cars.

A pair of horizontally extending webs 18 and 19 lie one above and one below the said fitting and extend from the pin 6 to the funnel 7 and are preferably formed integral therewith and with the portion 11 as aforesaid. The stem or projection 10 is connected to or formed integral with said webs or head, or is otherwise suitably connected with the head, and extends rearwardly therefrom on approximately the longitudinal center line or axis of the head and preferably in line with the center of the opening 16 in the portion 11. The projection 10 is of any desired length and is suitably perforated, as for instance at 20, to pivotally receive a suitable support used to suspend the head yieldingly from the car. At its rear end the stem is provided with a flange or projection 21 adapted to limit the forward movement of the head relative to its support, or to receive the endwise thrust of the buffer or supporting spring of said support.

To provide against accidental disconnection of the fitting or conduit 12 from the portion 11, I so mount the fitting in the ordinary train pipe hose 22 that the latter must be twisted one-fourth turn to the right or left in order to permit insertion of the fitting. This sets up stresses in the hose which causes the fitting to return to the normal service position shown in Figures 4 and 5 in which position it is maintained by the torsional resistance of the hose 22. It will be observed that the perforation 11 and the fitting or conduit 12 extend through the head at an angle to the longitudinal axis thereof. This is in order to reduce the tendency of the fluid pressure in the conduit 12 to force the heads apart, and also to minimize the friction to the flow of air in passing from one car to the other. The angle at which the conduit leads away from the head should be such as to cause it to point approximately directly to the center of the opening in the train pipe on the car from which the hose 22 leads.

A coupling head constructed to my improvement may, on account of the aforesaid reduced tendencies to separate the same, be rigidly maintained in engagement with a complementary head by the use of a buffer spring of relatively low resistance, thereby greatly reducing the strains on the bolts which support the automatic connecter from the car coupler and improving the service performance as a whole. For these reasons a distinct advance in the art is made by the present improvement.

Figure 1:
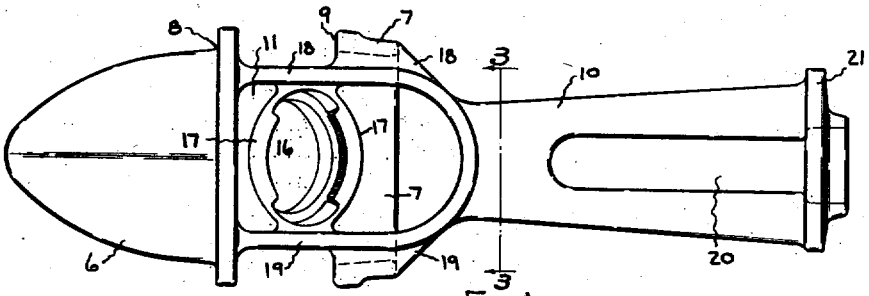
Figure 1 is a side elevation of my improved coupling head, with the hose 22 and the fitting 12 omitted.
Figure 2:
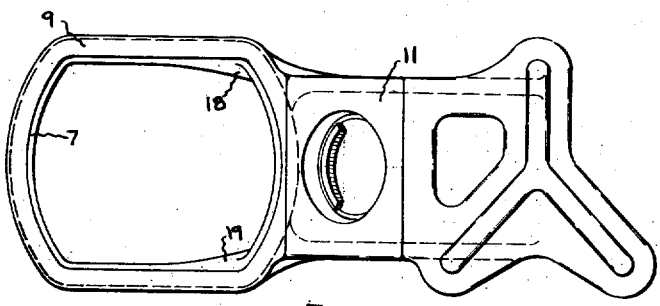
Figure 2 is a front elevation of the structure shown in Figure 1.
Figure 3:
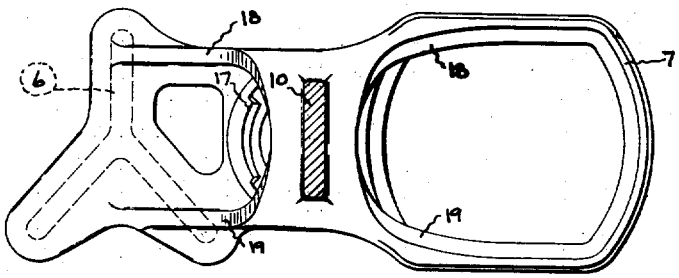
Figure 3 is a rear view of the structure shown in Figure 1, taken on line 3—3 of Figure 1.

The pin or horn 6 is, as aforesaid, preferably of such construction or formation as to give lightness and strength, instead of forming it of a solid piece of metal having the general outline of the ring or funnel 7, it is built up of a plurality of spaced webs as clearly shown in Figures 2 and 3, which webs properly fit within the ring 7 and in effect constitute a pin or horn having the contour of the outer edges of the webs. The accumulation of snow and ice on the horn to interfering extent is avoided by this construction, and lightness and strength are also secured. The horn is further cut away by forming an opening in its base as clearly appears at the left of the horn in Figure 2 and at the right thereof in Figure 3. Inasmuch as the funnel 7 in generally of ring formation, its opening does, of course, extend entirely therethrough, and hence provides an exit for, and induces exit of, snow and ice that would interferingly collect therein if the rear part of the apex of the funnel were closed.

What I claim is:—

1. An automatic train pipe connecter head having in combination, a central portion provided with an opening, pin and funnel guiding means comprising a horn guide integral with said central portion and arranged entirely on one side of the longitudinal center line of the head and comprising also a funnel guide integral with said central portion of the head and arranged entirely on the other side of said center line of the head for receiving said horn guide, said funnel guide having an opening extending entirely therethrough to induce exit of snow and ice that would otherwise collect therein, a conduit mounted in the opening in said central portion and disposed obliquely to said center line of the head, the opening and the conduit being substantially centrally located vertically with respect to said guiding means, a gasket supported in said opening by said conduit and having a contacting face arranged obliquely to said center line of the head, said gasket being removable rearwardly out of said opening from behind the base of said horn guide while said head is coupled to a mating head, and means for releasably securing said conduit in said opening and normally holding the same against undue rearward and forward movement therein.

2. An automatic train pipe connecter head of the type formed separately of and adapted to be suspended beneath the car coupler, said head comprising in combination a pair of guides arranged one on each side of the longitudinal axis of the head, one of said guides comprising a pin or horn and the other comprising a funnel having an opening extending entirely therethrough and generally longitudinal thereof to induce exit of snow and ice that would otherwise collect in the funnel, the funnel and said horn being integral and having their respective longitudinal axes extending parallel to the longitudinal axis of the head, said head having a portion arranged between said guides which said portion is provided with a substantially flat front face disposed obliquely to the longitudinal axis of the head and has a perforation located on said longitudinal axis, a gasket supporting conduit in said perforation, said conduit being readily removable from and insertable in said perforation from the rear of the base of said horn to permit renewal of said gasket while said head is coupled to a mating head, and means for supporting said head, said means including a projection extending rearwardly from said head and connected to the head between said guides and against which projection a connecter supporting spring is adapted to exert an endwise thrust.

3. An automatic train pipe connecter head of the type formed separately of and adapted to be suspended beneath a car coupler, said head comprising in combination, a rearwardly extending projection, adapted to receive the endwise thrust of a buffer spring, a central portion provided with an opening and with a front face arranged obliquely to and intersecting approximately the longitudinal center line of said projection, pin and funnel guiding means, the pin member thereof being rigid with said head and arranged entirely on one side of the longitudinal center line of said projection and the funnel guide member being rigid with the head and arranged entirely on the other side of the center line of said projection, said funnel member having an opening extending entirely therethrough and generally longitudinally thereof to induce exit of snow and ice that would otherwise collect in the funnel, a conduit mounted in said opening and arranged obliquely to the center line of said projection, a gasket supported in said opening by said conduit, releasable means for normally locking said conduit against undesired longitudinal movement in said opening, said conduit being removable from and insertable in said opening from behind the base of said pin member while said head is coupled to a mating head.

4. An automatic train pipe connecter head of the type formed separately of and adapted to be suspended beneath a car coupler, said head comprising in combination, a projection against which a connecter supporting spring is adapted to exert an endwise thrust, a central portion integral with said projection and provided with an opening which is arranged obliquely to the longitudinal center line of said projection, said portion being provided also with a flat front face arranged obliquely to and intersecting said center line, a guide member in the form of a prong integral with said projection and with said central portion and extending forwardly and flaring laterally away from said central portion and arranged on one side of said center line, a second guide member in the form of a ring which is also integral with said central portion and which extends rearwardly away from said central portion and is arranged on the other side of said center line, the opening in said central portion being located at substantially the vertical center of said head, a conduit mounted in said opening and arranged obliquely to said center line and carrying a gasket at its front end, and releasable means for normally locking said conduit in position in said opening with said gasket substantially flush with said flat front face, said conduit and gasket being removable rearwardly out of said opening from behind the base of said prong when said locking means are released and while said head remains coupled to a mating head, the point of connection between said guides and said central portion being substantially coincident and approximately in a plane intersected by the obliquely arranged flat front face of said central portion.

5. An automatic train pipe connecter head of the type formed separately of and adapted to be suspended beneath a coupler, comprising in combination, a front guide and a rear guide, the base of the front guide lying in advance of the front face of the rear guide, said front guide comprising a pin having its longitudinal axis extending substantially parallel to the longitudinal axis of the head, and said rear guide comprising a funnel or ring having its longitudinal axis extending substantially parallel to the longitudinal axis of the head, a substantially flat perforated portion extending diagonally from one of said guides across to the other and connecting the same, a conduit positioned behind said front guide and secured in said perforation, said conduit being removable from and insertable in said opening from the rear of the head while said head is coupled to a mating head.

6. An automatic train pipe connecter head of the type formed separately of and adapted to be suspended beneath the car coupler, comprising in combination, a rearwardly extending stem perforated to receive a connecter supporting member, said stem being connected with the head at one end and having at its other end a flange or stop adapted to engage said supporting member, said stem being adapted to receive the endwise thrust of a connecter supporting spring, a pair of guides of the pin and funnel type positioned one in advance of the other on opposite sides of the longitudinal axis of said pin, the base of each of the guides being disposed in a plane at substantially a right angle to said axis, said funnel having an opening extending entirely therethrough, a perforated portion extending diagonally across said axis and joined to said guides, the perforation in said portion being located at substantially the vertical center of said head, a fluid conduit mounted in said perforation and extending therethrough diagonally to said axis and removably locked in said perforation to conduct a fluid diagonally through said head, and a gasket carried by said conduit, said conduit being removable out of said perforated portion from the rear of the pin member of said guide to permit said gasket to be renewed while said head remains coupled to an opposing head.

7. An automatic train pipe connecter head comprising in combination, a pair of guides spaced one on each side of the longitudinal axis of the head, a gasket carrying conduit extending diagonally from between said guides across said longitudinal axis to conduct a fluid diagonally through said head, means for removably securing said conduit in place to permit the removal of said gasket while said head is coupled to an opposing head, said means including spaced lugs on said conduit and said head removably held in interlocked position by the torsional resistance of the train pipe hose of the car equipped.

8. In a train pipe connecter, in combination, a head having two laterally spaced guides rigid therewith, said head having a portion arranged between said guides and provided with an opening, a conduit mounted in said opening obliquely to the longitudinal axis of the head, a gasket carried by the front end of said conduit and having a contacting surface arranged obliquely to said longitudinal axis of the head, said conduit and gasket being removable rearwardly from said opening while said head is coupled to a mating head, and means for removably securing said conduit in said opening and normally holding the same against substantial forward or rearward movement therein.

9. In a train pipe connecter, in combination, a head and a shank extending rearwardly therefrom, said head having two laterally spaced guide members rigidly secured thereto, one of said members being arranged entirely on one side of the longitudinal axis of the head and the other member entirely on the other side of said axis, said head also having a portion arranged between said guide members and provided with an opening in line with the axis of said shank, a conduit mounted in said opening obliquely to the longitudinal axis of said head and shank, a gasket supported in said opening by said conduit and having a contacting surface arranged obliquely to said axis, said conduit and gasket being removable rearwardly from said opening while said head is coupled to a mating head, and means for removably securing said conduit in said opening and normally holding the same against substantial forward or rearward movement therein.

10. In a train pipe connecter, the combination of a head and a shank rigidly secured to each other, said head having a central portion provided with an opening in line with said shank, a guide rigidly secured to said head at each side of said central portion laterally of said opening, a conduit mounted in said opening and removable rearwardly therefrom while the head is connected to a mating head, said conduit being arranged obliquely to the longitudinal axis of the connecter, means for removably securing said conduit in said opening, one of said members being arranged entirely on one side of the longitudinal axis of the head and the other member entirely on the other side of said axis, a gasket mounted in the front end of said conduit and removable rearwardly therewith, and a train pipe hose secured to the rear end of said conduit.

11. In a train pipe connecter, the combination of a head and shank rigidly secured together, said head having a projection on one side of the axis of said shank and a recess on the other side thereof adapted to receive the projection on a mating head, said head having a portion arranged between said projection and recess, said portion having an opening therein in line with said shank, a conduit mounted in said opening obliquely to the longitudinal axis of said head and shank, a gasket supported in said opening by said conduit and having a contacting surface arranged obliquely to said axis, said conduit and gasket being removable rearwardly from said opening while said head is coupled to a mating head, and means for removably securing said conduit in said opening and normally holding the same against substantial forward or rearward movement therein.

In testimony whereof I hereunto affix my signature.

JOSEPH ROBINSON.